MULTIPLE GATE CRYOTRON SWITCH

Filed Feb. 18, 1957

INVENTOR.
DUDLEY A. BUCK
BY
Blair and Spencer
ATTORNEYS 2,959,688
Patented Nov. 8, 1960

2,959,688

MULTIPLE GATE CRYOTRON SWITCH

Dudley A. Buck, North Wilmington, Mass., assignor to Arthur D. Little, Inc., Cambridge, Mass.

Filed Feb. 18, 1957, Ser. No. 640,656
13 Claims. (Cl. 307—88.5)

This invention relates to the construction of a multiple gate cryotron switch. More particularly, it relates to a switch having superconductive gated elements and utilizing a minimum number of control coils.

Figure 2:
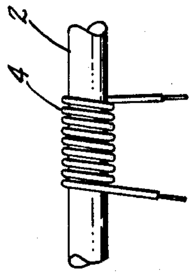
Figure 3:
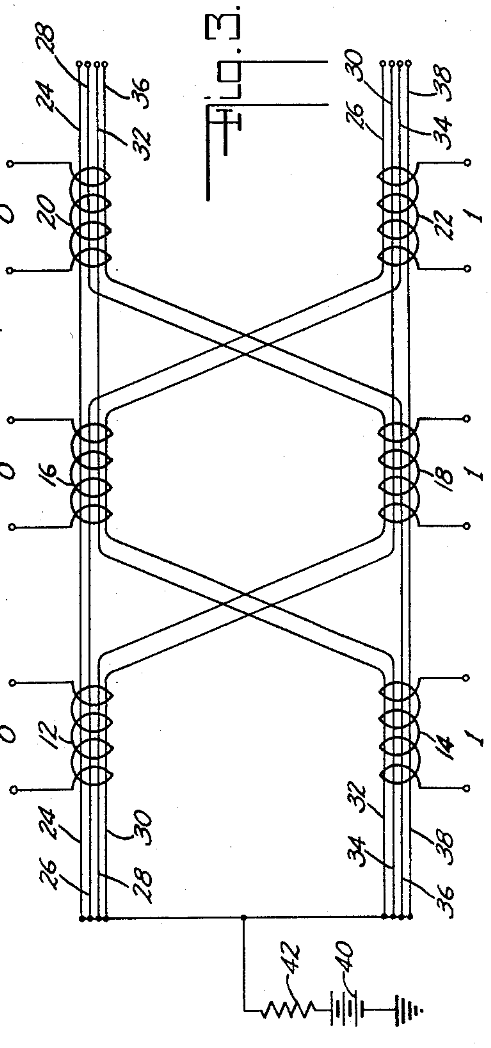
Figure 1:
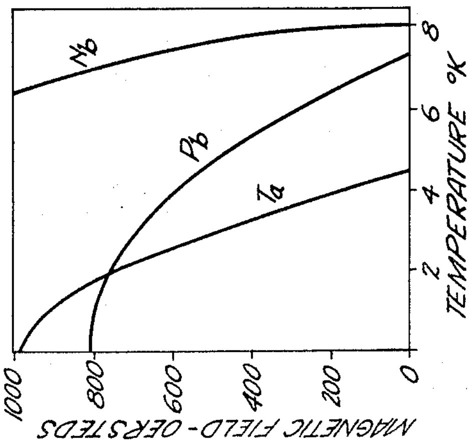

The construction and operation of my switch may best be understood from the following description taken with the accompanying drawings in which:

Figure 1 is a family of curves for different materials showing how the temperature at which certain materials become superconductive changes as a function of applied magnetic field, Figure 2 is a diagrammatic representation of a conventional cryotron, and Figure 3 is a diagrammatic representation of my multiple gate cryotron switch.

The cryotron, which is a switching element useful in digital computers, depends for its operation on the changes in properties of certain electrical conductors when subjected to temperatures approaching absolute zero. In the absence of a magnetic field, these materials change suddenly from a resistive state to a superconductive state in which their resistance is identically zero as the temperature approaches absolute zero. The temperature at which this change occurs is known as the transition temperature. When a magnetic field is applied to the conductor, the transition temperature is lowered, the relationship between applied magnetic field and transition temperature for certain specific materials being shown in Figure 1. As shown in this figure, in the absence of a magnetic field, tantalum loses all electrical resistance when reduced to a temperature of 4.4° K. or below, lead does so at 7.2° K. and niobium at 8° K. In all, there are 21 elements in addition to many alloys and compounds which undergo transition to the superconductive state at temperatures ranging between 0 and 17° K. The presence of a magnetic field causes the normal transition temperature to move to a lower value, or, if a constant temperature is maintained, a magnetic field of sufficient intensity will cause the superconductive material to revert to its normal resistive state. From Figure 1 it is apparent that a magnetic field of between 50 and 100 oersteds will cause a tantalum wire held at 4.2° K. (the temperature of liquid helium at atmospheric pressure) to change from a superconducting to a resistive state.

The cryotron is a circuit element which makes use of the shift between the superconductive and normally resistive states of these materials, when held at constant temperatures. A typical cryotron is illustrated in Figure 2 and includes a central or gate conductor 2, about which is wound a control coil 4, both the gate conductor and the coil being of materials which are normally superconductive at depressed temperatures. The entire unit is immersed in liquid helium to render the gate wire 2 and the control wire 4 superconductive. If a current of sufficient magnitude is applied to the control coil, the magnetic field produced thereby will cause the gate conductor to transfer from a superconductive to a resistive state. Thus the control coil and gate wire form an electrically operated switch which can be changed from a superconductive to a resistive state by the application of current to the control coil.

Tantalum is the preferable material for gate conductors, since its transition temperature in the 50 to 100 oersted region is 4.2° K., the boiling point of helium at atmospheric pressure. This temperature is attainable without the use of complicated pressure or vacuum equipment for raising or lowering the temperature of helium. Niobium, which has a relatively high quenching field (the field strength required to render a superconductive material resistive), is usually used as the material for the control coil since it is desirable, and in many cases necessary, that the control conductor remain superconductive throughout the operation of the cryotron, and this coil is subjected to substantially the same magnetic fields as those imposed on the gate conductor. Moreover, in most applications it is desirable to have the control conductor in the form of a coil such as coil 4 in Figure 2, since this configuration concentrates the magnetic flux and thus reduces the current necessary to produce a quenching field.

In practice the cryotron of Figure 2 may have a gate conductor 2 of 0.009 inch tantalum wire with a single layer control coil 4 of 0.003 inch niobium wound at a pitch of 250 turns per inch, the overall length of the cryotron being approximately 1 inch. The element generally operates in a bath of liquid helium, as do other cryotron devices. In addition to exceedingly small size, cryotrons have the advantage of low power dissipation. Thus, the cryotron is well suited for use as a basic element in binary digital computers, and various computer circuits such as flip-flops, etc., have been designed incorporating this element.

In many computer applications it is desirable to control the conductivity of more than a single conducting path as is done in the cryotron illustrated in Figure 2. For example, pulse distributors and control switches require several controlled conducting paths connected to a common input. For this purpose high speed single pole, multiple position switches are used which are capable of connecting their inputs to any one of a number of outputs in response to a series of binary digital input control signals. In conventional vacuum tube computers such switches generally are diode matrices with flip-flop inputs.

In digital computers using cryotrons as basic computing elements, it is desirable to use multiple position switches operating in the same manner as the cryotrons. Moreover, in other computers and in translators, multiple position switches having the desired number of positions may require large space and a great number of relatively unreliable components, making a switch operating on cryotron principles desirable in these applications as well.

Accordingly, it is an object of my invention to provide an improved multiple position switch which may be controlled by a combination of binary digits. It is a further object of this invention to provide a switch of the above character utilizing the superconductive properties of certain materials at depressed temperatures. It is another object of this invention to provide a switch of the above character capable of use in computers, particularly in cryotron computers. Yet another object of this invention is to provide a switch of the above character having a plurality of inputs and capable of use in computer translating devices. It is another object of this invention to provide a switch of the above character having a minimum number of control coils. Switches made according to my invention have low power dissipation and a large capacity per unit volume. Moreover, the input elements of the switch of my invention are capable of operation in conjunction with such cryotron devices as flip-flops, etc., this being a desirable feature when they are used in cryotron computers. As an additional feature, the switch is of low cost construction to permit the economical construction of a unit having many available positions.

The invention accordingly comprises the features of construction, combination of elements, and arrangement of parts which will be exemplified in the construction hereinafter set forth, and the scope of the invention will be indicated in the claims.

Referring to Figure 3, there is shown for illustrative purposes an eight position switch made according to my invention. This switch comprises a plurality of control coils 12, 14, 16, 18, 20 and 22, similar to the control coil 4 in Figure 2. These coils are arranged in input pairs in which one coil is energized for a Zero input and the other is energized for a One input. Each pair may thus form a control station. More particularly, coils 12, 16 and 20 may be utilized as Zero inputs and coils 14, 18 and 22 as One inputs. A series of gate conductors 24, 26, 28, 30, 32, 34, 36 and 38 are threaded through the control coils, each conductor passing through a different combination of coils. Thus gate conductor 24 is threaded through Zero coils 12, 16 and 20 and corresponds to the binary digital number 000. Conductor 26 is threaded through Zero coils 12 and 16 and One coil 22 and thus corresponds to the number 001, and so on.

The gate conductors are preferably tied together at one end by a wire 39 and connected to a power supply illustratively indicated by the battery 40 and resistor 42, the resistor having much greater resistance than the remainder of the circuit so that the power supply is essentially a constant current source. The other ends of the gate conductors form the outputs of the switch and in use are returned to ground or the other side of the battery through superconductive elements of the components controlled thereby. During operation the entire unit is immersed in a bath of liquid helium to maintain the gate conductors superconductive in the absence of applied magnetic fields. The wire 39 should also be superconductive at the temperature of operation.

In operation, control currents are impressed on either the Zero (12, 16, 20) or the One coil (14, 18, 22) in each control pair to cause the gate conductors passing therethrough to become resistive. As will be shown, any combination of coil energization will cause every conductor but one to become resistive. Therefore, since the path through this one conductor is entirely superconductive, i.e., its resistance is identically zero, all the current from the power supply will pass through it. By varying the combination of energized coils, the superconductive path may be moved from one gate conductor to another to shift the current through the switch to a different output terminal.

Thus my switch is essentially a single pole multiple position current switch responding to a combination of simultaneously occurring binary input signals.

It will be seen that the number of different paths available through the series of control coils is $2^n$ where $n$ is the number of pairs of control coils, and thus a million position switch will require but 20 input control coil pairs. Because of the small size of the wires and their configuration, such a million position switch may be packaged in a space only 3 inches square and 2 feet long. The relatively small size of such a switch, as compared with prior devices, is of important significance in this art.

As shown in Figure 3, one-half of the gate conductors pass through each control coil 12 or 14 of the first Zero-One pair; one-half the conductors from each of these coils pass through coil 16 and half through coil 18 of the second pair, etc. Thus half the total number of gate conductors pass through each coil. The switch accordingly has the physical appearance of a rope in which coils are wound about various groups of strands. The gate conductors may be formed from 1 to 3 mil tantalum wire, the lower size limit being determined by the problems involved in handling, connecting, welding, etc., fine wire. The wire should be as small as possible to minimize the necessary cross section of the control coils which are wound about the gate conductors. The inductance of the coils and the switching time of the switch may thereby be maintained at a minimum. Tantalum is a preferable material for the gate conductors because of the relatively low magnetic field intensity required to render it resistive at the preferred temperature of operation of the switch.

The control coils may be formed from 3 mil close-wound niobium wire which will not be quenched by the current required to operate the switch. Where the input signals to these coils are supplied from other cryotron elements, the coils should be capable of developing a quenching field, say 100 oersteds, over their entire cross sectional area without causing self-quenching of the cryotron gate conductors to which they are connected. Illustratively, for the eight-position switch illustrated in Figure 3, control coils 1 inch long having approximately 250 turns per inch should be sufficient for inputs from cryotron flip-flops without causing self-quenching of tantalum gate conductors in the flip-flops. In applications not requiring inputs from other cryotron devices, the input coils need not be superconductive and may have any number of turns consonant with the current capabilities of the input signal sources. Insulation on the gate conductors and the control coils should be as thin as possible. Illustratively, it may be a one-half mil coating of sintered polytetrafluoroethylene.

In operation, information in the form of binary digits is fed into the control coils in the form of current sufficient to quench the gate conductors therein. This control current is passed through the complement coils for the wire which is to be superconductive and through which the output current will flow. The complement of a given binary number is a number in which all the 1 digits are changed to 0 and all the 0 digits are changed to 1, e.g., the complement of 011 is 100. Thus the complement coils for a wire in the switch of Figure 3 are the coils through which the wire does not pass. For example, the 101 conductor 34 passes through One coil 14, Zero coil 16, and One coil 22. The complement of 101 is 010, corresponding to coils 12, 18 and 20 through which the wire does not pass. Also, the 101 wire 34 is the only wire of the group which does not pass through any of the coils 12, 18 or 20, since if a wires does not pass through any of these three coils, it must pass through coils 14, 16 and 22, the path taken by the wire 34. Thus, every other gate wire except wire 34 must pass through either coil 12, coil 18 or coil 20 and therefore be rendered resistive by energization of these latter three coils. Thus energization of the switch with 0, 1, 0, which is the complement of the desired number, results in selection of the wire corresponding to the number 101. While I have illustratively described the principle of operation with respect to the eight-position switch shown in Figure 3, the same principles of operation hold true for a switch having any number of control coil pairs. Moreover, it will be apparent that my switch in its broader aspects may have two groups of control coils for each control station with only one gate conductor passing through each coil. All Zero coils of each pair of groups would then be connected together as would the One coils; this switch would then resemble a conventional matrix switch.

Thus I have described a multiple gate cryotron switch which may be used in conjunction with cryotron binary digital computers and with other computers in which small size and low power consumption are desirable features. In its preferred form this switch comprises a series of input control coils in 0—1 pairs with a series of superconductive gate conductors threaded through different combinations of coils. Various combinations of Zero and One coils in different pairs may be energized, and for each such combination, one and only one gate conductor will remain superconductive. In the circuits in which the switch is connected, all of the current available to the switch will flow through this one conductor and, therefore, the applications of the switch as a control switch, etc., are readily apparent. In addition to inherently small size, my switch has the advantage of relatively low cost construction, since there are no internal connections. The only connections required in the preferred "rope type" version are those for input current to the relatively small number of control coils, one for each output, and one for the current input, at which point all the gate conductors may be welded together.

While I have described a switch adapted for use in binary systems, my invention may be used in systems having other bases. Thus in a trinary system, each station will have three control groups, each of which may comprise a single control coil to form a rope type switch.

It will thus be seen that the objects set forth above, among those made apparent from the preceding description are efficiently attained. Since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A multiple gate cryotron switch comprising, in combination, a plurality of pairs of control coils, a plurality of gate conductors threaded through each of said control coils and adapted to transfer between superconductive and resistive states under the influence of changes in the magnetic fields developed by currents in control coils through which they pass, each of said gate conductors passing through a single control coil in each of said pairs of control coils and through a combination of control coils different from every other combination thereof with which said other gate conductors are associated, and means connecting one end of each of said gate conductors to one end of every other gate conductor.

2. A multiple gate switch comprising, in combination, a plurality of gate conductors, said gate conductors being superconductive at the temperature of operation of said switch in the absence of a quenching magnetic field and resistive in the presence of a quenching field, a plurality of control conductors, each of said control conductors being adapted to generate a quenching field upon passage of a given current through it, each of said control conductors having a plurality of gate conductors in its quenching field, each of said gate conductors being so disposed as to be in the quenching field of fewer than all of said control conductors and in the quenching fields of a different combination of control conductors than any other of said gate conductors, whereby selection of a superconductive gate conductor in said switch may be effected by passing currents giving rise to quenching fields through control conductors other than those in whose quenching fields the selected gate conductor is disposed.

3. The combination defined in claim 2 in which the combinations of control conductor quenching fields and gate conductors disposed therein are so ordered that any single superconductive gate conductor may be selected by passing said currents through one half the total number of control conductors.

4. A multiple position switch in which a single superconductive path may be selected according to a digital code, said switch comprising, in combination, a plurality of gate conductors, said gate conductors being superconductive at the temperature of operation of said switch in the absence of a quenching magnetic field and resistive in the presence of a quenching field, a plurality of control conductors, each of said control conductors being adapted to generate a quenching field upon passage of a given current through it, said control conductors being schematically arranged in sets, the number of control conductors in each set being equal to the number of different digits in said code, each control conductor in a set corresponding to a different digit in said code, each of said gate conductors being so disposed as to be in the quenching field of a single control conductor in each set thereof and in the quenching fields of a different combination of control conductors than every other gate conductor, whereby selection of a single superconductive gate conductor corresponding to a number in said code may be effected by passing currents giving rise to quenching fields through control conductors other than those in whose quenching fields said selected conductor is disposed.

5. The combination defined in claim 4 in which each of said sets comprises two control conductors and selection of a single superconductive gate conductor may be accomplished according to a binary code by passing said currents through one control conductor in each set thereof.

6. The combination defined in claim 5 including means for maintaining said gate conductors at a temperature below the transition temperature, whereby they are superconductive in the absence of an applied magnetic field.

7. A multiple gate switch comprising, in combination, a plurality of pairs of control conductors, a plurality of gate conductors which are superconductive at the temperature of operation of said switch in the absence of a quenching magnetic field and resistive in the presence of a quenching field, each of said control conductors developing a quenching field when a current of a given magnitude is passed through it, each of said gate conductors being so disposed as to be in the quenching field of a single control conductor in each pair thereof, each of said gate conductors being subject to a different combination of said quenching fields than every other gate conductor, each of said control conductors having in its quenching field a plurality of said gate conductors.

8. A multiple gate cryotron switch comprising, in combination, a plurality of pairs of control coils, gate conductors threaded through said control coils and adapted to transfer between superconductive and resistive states under the influence of changes in the magnetic fields developed by currents in control coils through which they pass, each of said gate conductors passing through a single control coil in each of said pairs of control coils and through a combination of control coils different from every other combination thereof with which said other gate conductors are associated, means connecting one end of each of said gate conductors to one end of every other gate conductor, and means for maintaining said gate conductors at a temperature below the transition temperature, whereby they are superconductive in the absence of an applied magnetic field.

9. The combination defined in claim 7 including means for maintaining said gate conductors at a temperature below the transition temperature, whereby they are superconductive in the absence of an applied magnetic field.

10. The combination defined in claim 7 in which each of said control conductors is in the form of a coil with the gate conductors associated therewith passing therethrough.

11. The combination defined in claim 7 in which one end of each of said gate conductors is connected to one end of every other gate conductor.

12. The combination defined in claim 7 in which said control conductors are of a material which remains superconductive throughout operation of said switch, whereby the inputs to said switch may be from cryotron devices.

13. The combination defined in claim 7 in which said gate conductors are of tantalum and said control conductors are of niobium.

References Cited in the file of this patent

UNITED STATES PATENTS 2,691,152 Stuart-Williams ---------- Oct. 5, 1954

OTHER REFERENCES

"Ferroelectrics for Digital Information Storage and Switching," by D. A. Buck, pub. by Mass. Inst. of Technology, June 5, 1952, pp. 26–29, Figs. 26–28.

"The Cryotron-A Superconductive Computer Component," by D. A. Buck, in Proceedings of the I.R.E., vol. 44, No. 4, April 1956, pp. 482–493.